Figure 3:
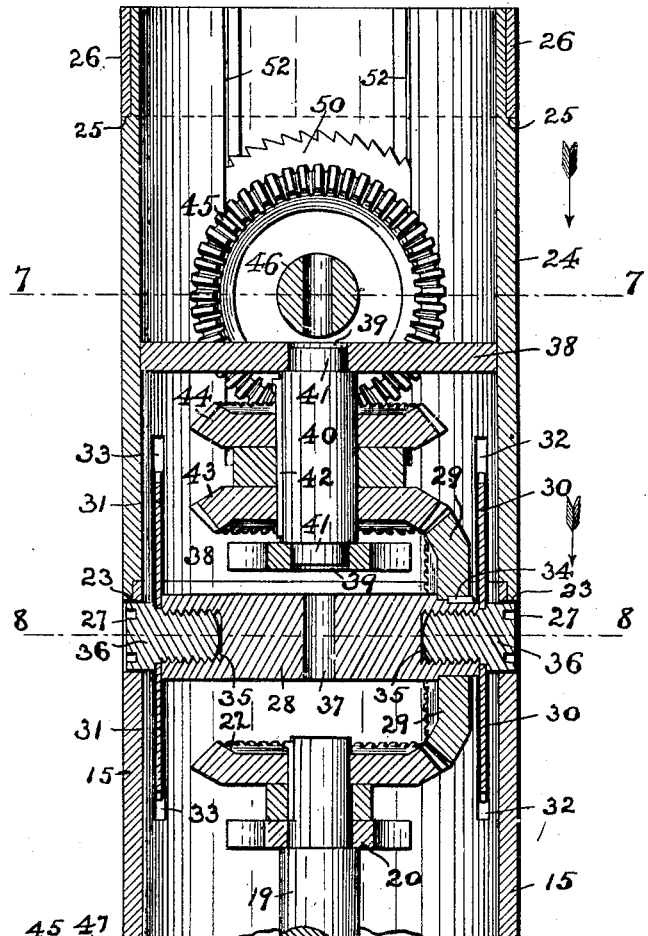

No. 679,597. Patented July 30, 1901.
W. BROWN.
APPARATUS FOR PROVIDING WOODEN SHELLS OR OTHER ARTICLES WITH LONGITUDINAL OPENINGS OR DUCTS OF POLYGONAL CROSS SECTION.
(Application filed Sept. 6, 1900.)
(No Model.) 3 Sheets—Sheet 1.
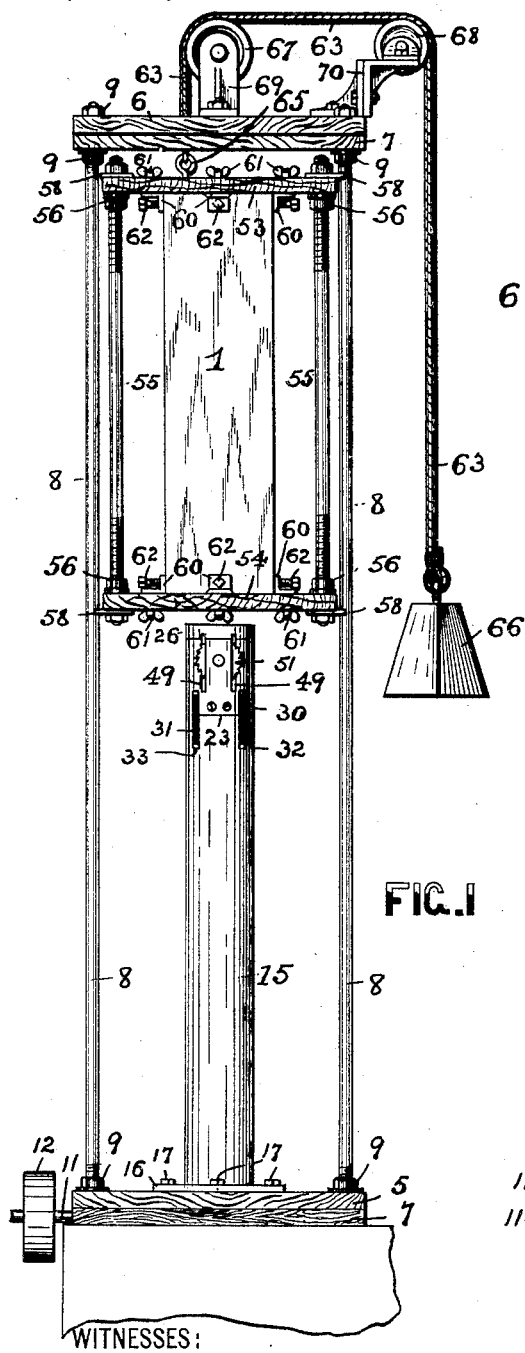
FIG. 1
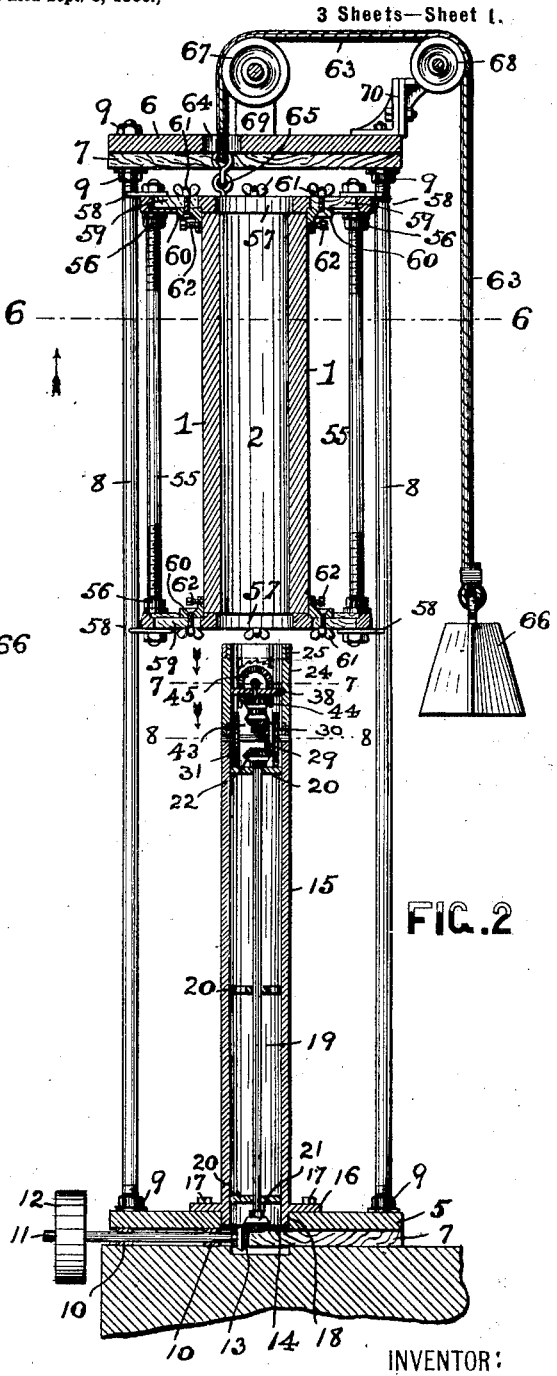
FIG. 2
WITNESSES:
INVENTOR:
WILLIAM BROWN
BY
Fred'k C. Fraentzel,
ATTORNEY
THE NORRIS PETERS CO., PHOTO-LITHO., WASHINGTON, D. C.

No. 679,597. Patented July 30, 1901.
W. BROWN.
APPARATUS FOR PROVIDING WOODEN SHELLS OR OTHER ARTICLES WITH LONGITUDINAL OPENINGS OR DUCTS OF POLYGONAL CROSS SECTION.
(Application filed Sept. 6, 1900.)
(No Model.) 3 Sheets—Sheet 2.

WITNESSES:
Geo. D. Richards

INVENTOR:
WILLIAM BROWN
BY Fred T. C. Fraentzel
ATTORNEY

No. 679,597. Patented July 30, 1901.
W. BROWN.
APPARATUS FOR PROVIDING WOODEN SHELLS OR OTHER ARTICLES WITH LONGITUDINAL OPENINGS OR DUCTS OF POLYGONAL CROSS SECTION.
(Application filed Sept. 6, 1900.)

(No Model.) 3 Sheets—Sheet 3.

WITNESSES:
Geo. D. Richards

INVENTOR:
WILLIAM BROWN.
BY
Fred C. Fraentzel
ATTORNEY

THE NORRIS PETERS CO., PHOTO-LITHO., WASHINGTON, D. C.

UNITED STATES PATENT OFFICE.

WILLIAM BROWN, OF PLAINFIELD, NEW JERSEY.

APPARATUS FOR PROVIDING WOODEN SHELLS OR OTHER ARTICLES WITH LONGITUDINAL OPENINGS OR DUCTS OF POLYGONAL CROSS-SECTION.

SPECIFICATION forming part of Letters Patent No. 679,597, dated July 30, 1901.

Application filed September 6, 1900. Serial No. 29,184. (No model.)

*To all whom it may concern:*

Be it known that I, WILLIAM BROWN, a subject of the Queen of Great Britain, residing at Plainfield, in the county of Union and State of New Jersey, have invented certain new and useful Improvements in Apparatus for Providing Wooden Shells or other Articles with Longitudinal Openings or Ducts of Polygonal Cross-Section; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention has reference to a novel apparatus or machine for providing wooden shells, and especially such as are ordinarily employed for use in baths and between the baths and printing-machines to roll or wind the web thereon and for other uses in processes of bleaching or dyeing, with an angular hole or duct which will be of a polygonal cross-section and will extend longitudinally through the entire length or partly through the length of the shell.

This invention therefore has for its principal object the production of a simply-constructed and effectively-operating mechanism for the purposes above stated, with a view of more quickly and more cheaply providing the wooden shell with a longitudinally-arranged and polygonally-shaped duct.

My invention therefore consists in the novel construction of apparatus hereinafter described; and, furthermore, the invention consists in the several novel arrangements and combinations of the various parts, as well as in the details of the construction thereof, all of which will be more fully set forth in the accompanying specification and then finally embodied in the clauses of the claim, which form a part of this specification.

This invention is clearly illustrated in the accompanying drawings, in which—

Figures 4, 5:
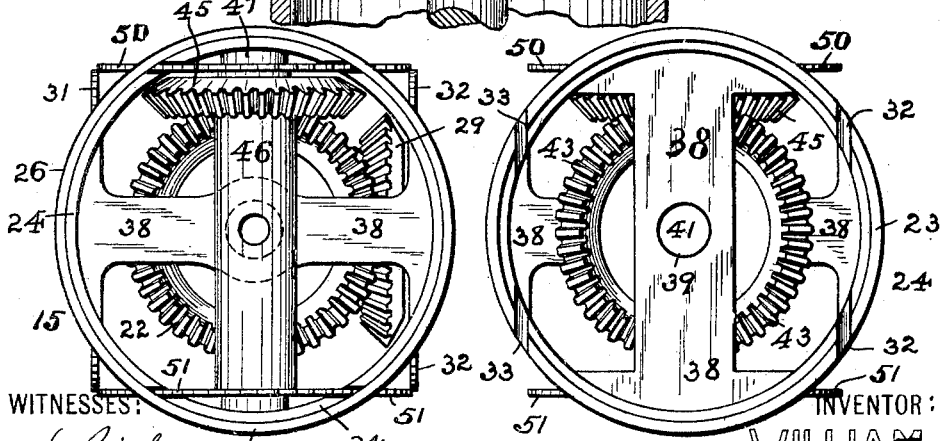
Figure 6:
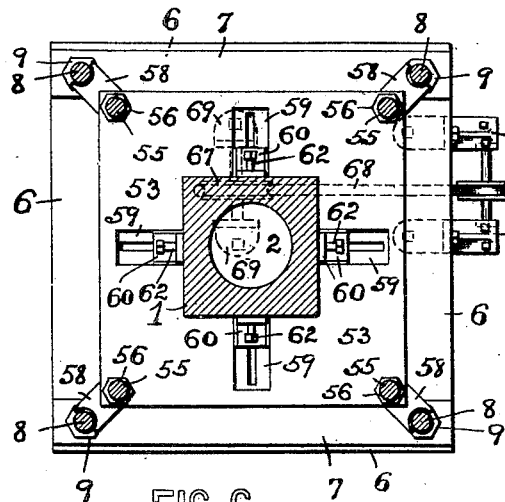
Figure 7:
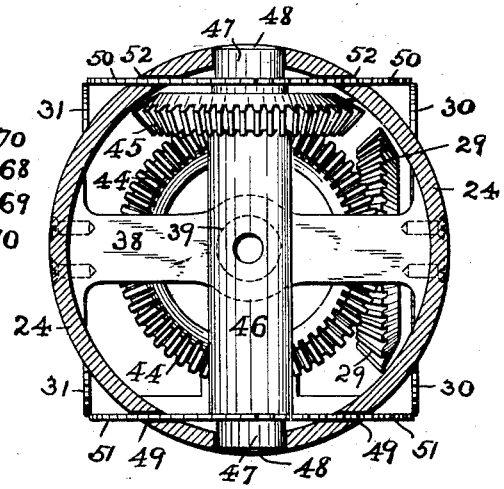
Figure 8:
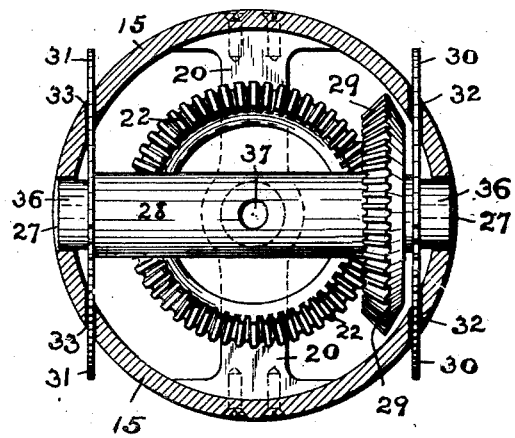
Figure 9:
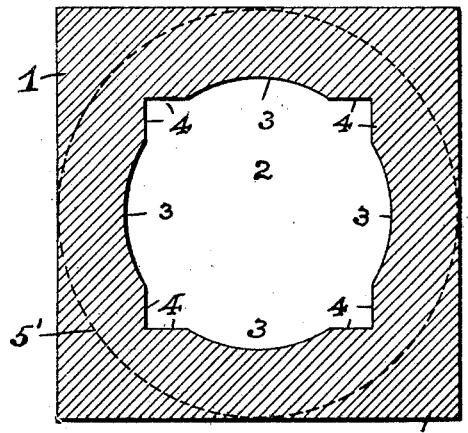
Figure 10:
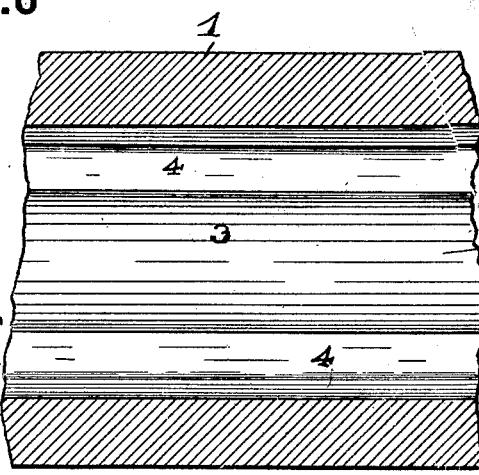

Figure 1 is a front view of one form of apparatus embodying the principles of my invention, and Fig. 2 a longitudinal vertical section of the same. Fig. 3 is a longitudinal vertical section, on an enlarged scale, of the upper portion of a tubular standard, a gang of saws or cutters connected therewith, and mechanism for operating the said saws or cutters. Figs. 4 and 5 are a top and bottom view, respectively, of the upper tubular section of said standard. Fig. 6 is a horizontal cross-section of the apparatus, taken on line 6 6 in Fig. 2; and Figs. 7 and 8 are horizontal cross-sections taken, respectively, on lines 7 7 and 8 8 in either of Figs. 2 or 3. Fig. 9 is a horizontal cross-section of a wooden shell provided with a longitudinal duct produced by a gang of saws or cutters, illustrated in the previously-described figures of the drawings; and Fig. 10 is a longitudinal vertical section of a portion of the wooden shell.

Similar numerals of reference are employed in all of the said above-described views to indicate corresponding parts.

In the said drawings, in Figs. 1, 2, 9, and 10 the numeral 1 indicates the shell, of wood, which is to be turned down on the dotted line 5' (indicated in Fig. 9) to provide a cylindrical or roller-shaped shell; but this is not absolutely necessary, and this feature is sometimes varied.

In the production of the wooden shells for the purposes above stated the shell is first provided with a cylindrical bore which is turned or bored out in the usual manner, and that the finished shell may be arranged and suspended on the receiving-core, which is usually of a square shape in cross-section, but which may be of any other suitable polygonal cross-section, portions of the cylindrical outline 3 of the bore 2 are cut away by means of my novel construction of apparatus hereinafter fully set forth to produce angular recesses 4, which extend from end to end of the shell and by means of which the shell can be fitted on the core, which also has a polygonal cross-section.

The apparatus for providing wooden or other suitable shells with bores having a polygonal cross-section consists, essentially, of a base 5 and top 6, both of which are preferably provided with cleats 7 for strengthening said base and top and preventing their becoming warped when made of wood. It is not essential, however, that the base and top are made of wood, for metal plates may be employed, if desired. The said base and top are usually connected by means of suitable tie-rods 8 and nuts 9, arranged on screw-threaded portions of the said rods, substantially as represented in Figs. 1 and 2. Secured in any suitable manner against the under side of the base 5 are bearings 10, (see Fig. 2,) in which there is a main shaft 11. This shaft is provided at its one end with a driving-pulley 12 and upon its other end and beneath a centrally-disposed opening 14, in the central portion of the base 5, with a miter or bevel gear 13, substantially as and for the purposes hereinafter more fully specified.

Upon the said base 5 is a tubular standard 15, which is provided at or near its lower end with a flange 16, which rests upon the base 5 and is secured in position by means of bolts or screws 17, substantially as illustrated. The lower end portion 18 of this standard 15 is also securely fitted in the said opening 14 in the base 5, and the said standard is thereby held in a fixed position for the reception of a vertical spindle 19. This spindle is provided at its lower end with a miter or bevel gear 21, which meshes with the bevel or miter gear 13 on the main driving-shaft 10. The said spindle 19 is also rotatively arranged in any desirable number of bearings in suitable plates 20, which are secured within the said tubular standard 15 in any desirable and well-known manner. Upon the upper end of the said spindle 19 is secured in any well-known manner a miter or bevel gear 22. These bevel-gears are secured upon the said ends of the spindle 19 in the usual manner of securing such parts together. The said tubular standard 15 is provided at its upper end with an annular shoulder 23 and has fitted thereon a tubular section 24, which is in like manner provided at its upper end with an annular shoulder 25 for the reception of a retaining-ring 26, all of which is more clearly represented in Fig. 3 of the drawings.

As will be seen more especially from an inspection of Fig. 3, I have rotatively arranged in oppositely-placed holes 27 in the upper portion of the tubular standard 15 a horizontally-arranged spindle 28, which is provided at or near its one end with a miter or bevel wheel 29, in mesh with the bevel or miter wheel 21, secured upon the upper end of the vertical spindle 19, as previously stated. This miter or bevel gear 29 is preferably secured in place upon the spindle 28 by means of a key 34, as shown, so as to rest against a suitable shoulder on the said spindle 28. In order that the spindle 28 may be suitably secured in position in the inner tubular part of the standard 15, I have provided each end of the said spindle with a screw-threaded socket 35, into each of which is screwed a screw bolt or stud 36, the cylindrical heads of which are relatively arranged in the holes or bearing portions 27 in the standard 15, substantially as shown in said Fig. 3. The said screw-bolts 36 also serve to securely arrange in place against the respective ends of the spindle 28 a pair of rotary cutters or circular saws 30 and 31, the said cutters or saws being made to partially project into and through slots 32 and 33 in the said upper portion of the standard 15, as will be clearly evident from an inspection of the several figures of the drawings. In order that the screw-bolts 36 can be properly screwed into the socketed ends of the spindle 28, the latter is provided with a hole 37 for the reception of a rod or other means to prevent turning of the spindle, as will be clearly evident; but other means to prevent turning of the spindle when securing the screw-bolts in position may be employed, if desired.

In the upper tubular section 24, which rests upon the annular shoulder 23 of the upper portion of the standard 15, as previously stated, I have secured in any well-known manner a pair of bearing-plates 38. These are provided with holes 39, forming bearings for the end portions 41 of a vertical spindle 40, which is arranged between the said plates 38. Secured upon the said vertical spindle 40, preferably by means of a key 42, is a bevel or miter gear 43, which is in mesh with the gear 29 and is actuated from the latter to cause the rotation of the vertical spindle 40. A second bevel or miter gear 44 is likewise secured by means of the key 42 upon the spindle 40, the said bevel or miter gear being in operative engagement with a bevel or miter gear 45. This gear 45 is secured upon a horizontal spindle 46, which is provided at its opposite ends with screw-bolts 47, secured in the ends of the said spindle 46 in the manner of the screw-bolts 36, connected with the spindle 28. The heads of these screw-bolts 47 are rotatively arranged in holes 48 in the opposite sides of the tubular section 24, substantially as illustrated in Fig. 7. The heads of the screw-bolts 47 are also made to secure a pair of circular saws or cutters 50 and 51 in position upon the said spindle 46. These saws or cutters project into and through slots 52 and 49 in the cylindrical surface of the said upper tubular section 24, as shown. When viewed from the top, this pair of saws 50 and 51 and the pair of saws 30 and 31 are arranged in vertical and parallel planes, each pair of planes being at right angles to each other, whereby the saws when the parts of the mechanism just described are operated will be rotated in similarly-disposed planes, and should a block of wood or a shell provided with a cylindrical bore, as indicated in Fig. 9, be forced down against the several revolving saws or cutters, then angular corners 4 will be cut longitudinally in the block or shell 1 and an opening or duct of approximately the shape illustrated in cross-section in Fig. 9 will be the result, whereby the shell can be secured, placed upon a polygonal core, and made to turn with the same.

The means for bringing the wooden shell or block 1 against the revolving saws or cutters to produce an opening or duct similar to that represented in Fig. 9 is clearly illustrated in Figs. 1, 2, and 6. As will be seen from an inspection of the said figures, this means comprises a cradle or support consisting, essentially, of a top piece 53 and a base-piece 54, which are adjustably connected by tie-rods 55 and the nuts 56 on the screw ends of the said rods. Secured to the said top and base pieces by means of the tie-rods 55 or in any other suitable manner are suitably-constructed guides 58, which are made to partially embrace the tie-rods 8 and slide against the same, as will be seen from Fig. 6, to properly guide the cradle or support for the shell 1 and cause the central openings 57 in both the top and base pieces of the said device to pass around the tubular standard when lowered by the means and in the manner to be presently described. Each plate 53 and 54 is provided with suitably-disposed guide portions 59, in which are adjustably secured by means of the set-screws 61 certain angle-irons 60, which can be forced against the cutter-surface at the top and bottom of the shell 1, as shown, and then secured in position by means of the set-screws 62. In this manner the said shell or block 1 can be properly adjusted to have its central cylindrical opening or duct 2 pass directly over the tubular standard and have the teeth of the rapidly-revolving gangs of cutters or saws cut the angular parts 4. (Shown in Fig. 9.)

One means for raising and lowering the cradle or support for the shell 1 consists in an arrangement of rope or other flexible connection 63, which has its one end passing through an opening 64 in the top piece or plate 6 of the apparatus and is secured by means of a ring 65 to the top piece 53 of the cradle or support in which the shell is arranged. The said flexible connection or rope passes over suitable wheels 67 and 68, which are grooved and which rotate in bearings 69 and 70 upon the top 6 of the apparatus. A weight 66, which is attached to the opposite and free end of the rope or flexible connection, serves to counterbalance the weight of the cradle and the shell therein and allows the operator to readily arrange the end of the shell in the cradle upon the gangs of cutters or saws or to easily raise the cradle when the shell has been provided with the longitudinal opening or duct of the shape desired.

Of course it will be understood that I may employ any other suitable means for raising and lowering the cradle and bringing the end of the shell over the tubular standard in contact with the rotary cutters or saws of the apparatus. I am also aware that other changes may be made in the several arrangements and combinations of the various parts, as well as in the details of the construction thereof, without departing from the scope of my present invention. Hence I do not limit my invention to the exact arrangements and combinations of the mechanism as herein described, and illustrated in the accompanying drawings, nor do I confine myself to the exact details of the construction of the parts of the mechanism.

Having thus described my invention, what I claim is—

1. In an apparatus for providing a wooden shell or other article with a longitudinal opening or duct having an angular cross-section, the combination, with the frame of the apparatus, and a vertical standard in said frame, of a movable cradle or support in which the shell or article to be cut is arranged, provided with an opening for permitting the movement of said cradle over and around said standard, and a cutting mechanism in said standard against which the shell or article in the cradle or support is brought, comprising circular saws arranged in pairs and operating in vertical planes at angles to each other, substantially as and for the purposes set forth.

2. In an apparatus for providing a wooden shell or other article with a longitudinal opening or duct having an angular cross-section, the combination, with the frame of the apparatus, and a vertical standard in said frame, of a movable cradle or support in which the shell or article to be cut is arranged, provided with an opening for permitting the movement of said cradle over and around said standard, a gang of circular saws in said standard against which the shell or article in the cradle or support is brought, said saws being arranged in pairs and operating in planes at right angles to each other, and means for operating said cutters or saws, substantially as and for the purposes set forth.

3. In an apparatus for providing a wooden shell or other article with a longitudinal opening or duct having an angular cross-section, the combination, with the frame of the apparatus and a vertical standard in said frame, of a movable cradle or support in which the shell or article to be cut is arranged, provided with an opening for permitting the movement of said cradle over and around said standard, a gang of circular saws in said standard against which the shell or article in the cradle or support is brought, said saws being arranged in pairs and operating in planes at right angles to each other, and means for operating said cutters or saws, consisting, essentially, of a vertical spindle, a main driving-shaft and gear mechanism connected therewith for driving said vertical spindle, and a second set of gears operated from said vertical spindle, for driving the said gang of saws, substantially as and for the purposes set forth.

4. In an apparatus for providing a wooden shell or other article with a longitudinal opening or duct having an angular cross-section, the combination, with the frame of the apparatus, consisting, essentially, of a base and top, and connecting tie-rods, of a movable cradle or support in which the shell or article to be cut is arranged, consisting, of a base and a top piece, having central openings, connecting tie-rods between said base and top pieces, and a guiding means connected with said base and top pieces of the cradle, in sliding engagement with the tie-rods of the main frame, a tubular standard upon the base of said frame of the apparatus over which the base and top pieces of said cradle or support can be made to reciprocate, and a cutting mechanism in said tubular standard against which the shell or article in the cradle or support is brought, comprising circular saws arranged in pairs and operating in vertical planes at angles to each other, substantially as and for the purposes set forth.

5. In an apparatus for providing a wooden shell or other article with a longitudinal opening or duct having an angular cross-section, the combination, with the frame of the apparatus, consisting, essentially, of a base and top, and connecting tie-rods, of a movable cradle or support in which the shell or article to be cut is arranged, consisting, of a base and a top piece, having central openings, connecting tie-rods between said base and top pieces, and a guiding means connected with said base and top pieces of the cradle, in sliding engagement with the tie-rods of the main frame, a tubular standard upon the base of said frame of the apparatus over which the base and top pieces of said cradle or support can be made to reciprocate, a gang of circular saws in said tubular standard against which the shell or article in the cradle or support is brought, said saws being arranged in pairs and operating in planes at right angles to each other, and means for operating said cutters or saws, substantially as and for the purposes set forth.

6. In an apparatus for providing a wooden shell or other article with a longitudinal opening or duct having an angular cross-section, the combination, with the frame of the apparatus, consisting, essentially, of a base and top, and connecting tie-rods, of a movable cradle or support in which the shell or article to be cut is arranged, consisting, of a base and a top piece, having central openings, connecting tie-rods between said base and top pieces, and a guiding means connected with said base and top pieces of the cradle, in sliding engagement with the tie-rods of the main frame, a tubular standard upon the base of said frame of the apparatus over which the base and top pieces of said cradle or support can be made to reciprocate, a gang of circular saws in said tubular standard against which the shell or article in the cradle or support is brought, said saws being arranged in pairs and operating in planes at right angles to each other, and means for operating said cutters or saws, consisting, essentially, of a vertical spindle, a main driving-shaft and gear mechanism connected therewith for driving said vertical spindle, and a second set of gears operated from said vertical spindle, for driving the gang of circular saws, substantially as and for the purposes set forth.

7. In an apparatus for providing a wooden shell or other article with a longitudinal opening or duct having a polygonal cross-section, the combination, with the frame of the apparatus, of a movable cradle or support in which the shell or article to be cut is arranged, a tubular standard 15 in said frame of the apparatus, and a tubular section 24 on the upper portion of said tubular standard, said tubular standard and section having oppositely-arranged slots, and a gang of rotary cutters or saws in said tubular standard and said tubular section, having portions of the cutters or saws extending into and through said oppositely-arranged slots, against which the shell or article in the cradle or support is brought, substantially as and for the purposes set forth.

8. In an apparatus for providing a wooden shell or other article with a longitudinal opening or duct having a polygonal cross-section, the combination, with the frame of the apparatus, of a movable cradle or support in which the shell or article to be cut is arranged, a tubular standard 15 in said frame of the apparatus, and a tubular section 24 on the upper portion of said tubular standard, said tubular standard and section having oppositely-arranged slots, bearing portions in said tubular standard and said tubular section, a vertical spindle in said bearing portions in said tubular standard, a main driving-shaft and gear mechanism connected therewith for driving said vertical spindle, a horizontal spindle in the upper portion of said tubular standard, means for operating the same from said vertical spindle, and a set of rotary cutters or saws on said horizontal spindle, a second set of spindles in the tubular section on said tubular standard, means for operating said second set of spindles, and a set of rotary cutters or saws on one of the spindles in the said tubular section, said cutters or saws having portions extending into and through said oppositely-placed slots arranged respectively in the said tubular standard and the tubular section on said standard, against which the shell or article in the cradle or support is brought, substantially as and for the purposes set forth.

9. In an apparatus for providing a wooden shell or other article with a longitudinal opening or duct having a polygonal cross-section, consisting, essentially, of a base and a top, and connecting tie-rods, of a movable cradle or support in which the shell or article to be cut is arranged, a tubular standard on said base of the apparatus over which said cradle or support can be made to reciprocate, and said standard being provided with oppositely-placed slots, and a cutting mechanism in said tubular standard against which the shell or article in the cradle is brought, comprising circular saws arranged in pairs and operating in vertical planes at angles to each other and said saws working in said slots of the standard, substantially as and for the purposes set forth.

10. In an apparatus for providing a wooden shell or other article with a longitudinal opening or duct having a polygonal cross-section, consisting, essentially, of a base and a top, and connecting tie-rods, of a movable cradle or support in which the shell or article to be cut is arranged, a tubular standard on said base of the apparatus over which said cradle or support can be made to reciprocate, and said standards being provided with oppositely-placed slots, a gang of circular saws in said tubular standard against which the shell or article in the cradle or support is brought, said saws being arranged in pairs and operating in planes at right angles to each other and said saws working in said slots of the standard, substantially as and for the purposes set forth.

11. In an apparatus for providing a wooden shell or other article with a longitudinal opening or duct having a polygonal cross-section, consisting, essentially, of a base and a top, and connecting tie-rods, of a movable cradle or support in which the shell or article to be cut is arranged, a tubular standard on said base of the apparatus over which said cradle or support can be made to reciprocate, and said standard being provided with oppositely-placed slots, a gang of circular saws in said tubular standard against which the shell or article in the cradle is brought, said saws being arranged in pairs and operating in planes at right angles to each other and said saws working in said slots of the standard, consisting, essentially, of a vertical spindle, a main driving-shaft and gear mechanism connected therewith for driving said vertical spindle, and a second set of gears operated from said vertical spindle, for driving the gang of circular saws, substantially as and for the purposes set forth.

12. In an apparatus for providing a wooden shell or other article with a longitudinal opening or duct having a polygonal cross-section, consisting, essentially, of a base and a top, and connecting tie-rods, of a cradle, or support in which the shell or article to be cut is arranged, movably arranged between said base and top and said tie-rods, a tubular standard 15 on said base of the apparatus, and a tubular section 24 on the upper portion of said tubular standard, said tubular standard and section having oppositely-arranged slots, and a gang of rotary cutters or saws in said tubular standard and said tubular section, having portions of the cutters or saws extending into and through said oppositely-arranged slots, against which the shell or article in the cradle or support is brought, substantially as and for the purposes set forth.

13. In an apparatus for providing a wooden shell or other article with a longitudinal opening or duct having a polygonal cross-section, consisting, essentially, of a base and a top, and connecting tie-rods, of a cradle or support in which the shell or article to be cut is arranged, movably arranged between said base and top and said tie-rods, a tubular standard 15 on said base of the apparatus, and a tubular section 24 on the upper portion of said tubular standard, said tubular standard and section having oppositely-arranged slots, bearing portions in said tubular standard and said tubular section, a vertical spindle in said bearing portions in the tubular standard, a main driving-shaft and gear mechanism connected therewith for driving said vertical spindle, a horizontal spindle in the upper portion of said tubular standard, means for operating the same from said vertical spindle, a second set of spindles in the tubular section on said tubular standard, means for operating said second set of spindles, and a set of rotary cutters or saws on one of the spindles in the said tubular section, said cutters or saws having portions extending into and through said oppositely-placed slots arranged respectively in said tubular standard and the tubular section on said standard, against which the shell or article in the cradle or support is brought, substantially as and for the purposes set forth.

14. In an apparatus for providing a wooden shell or other article with a longitudinal opening or duct having a polygonal cross-section, the combination, with the frame of the apparatus, and a movable cradle or support in which the shell or article to be cut is arranged, of a tubular standard in said frame of the apparatus provided with oppositely-placed openings forming bearings, having oppositely-placed slots, a horizontal spindle 28, screw-bolts at the ends of said horizontal spindle having their heads rotatively arranged in said bearing portions, rotary cutters or saws on said horizontal spindle, having portions thereof extending into and through said oppositely-placed slots, and means connected with said horizontal spindle for causing a rotary motion of the same, substantially as and for the purposes set forth.

15. In an apparatus for providing a wooden shell or other article with a longitudinal opening or duct having a polygonal cross-section, the combination, with the frame of the apparatus, and a movable cradle or support in which the shell or article to be cut is arranged, of a tubular standard in said frame of the apparatus provided with oppositely-placed openings forming bearings, and having oppositely-placed slots, a horizontal spindle 28, screw-bolts at the ends of said horizontal spindle having their heads rotatively arranged in said bearing portions, rotary cutters or saws on said horizontal spindle, having portions thereof extending into and through said oppositely-placed slots, and means connected with said horizontal spindle for causing a rotary motion of the same, consisting, essentially, of a vertical spindle in said tubular standard, a main driving-shaft and gear mechanism connected therewith for driving said vertical spindle, a gear 21 upon the upper end of said vertical spindle, and a gear 29 on said horizontal spindle in mesh with said gear 21, substantially as and for the purposes set forth.

In testimony that I claim the invention set forth above I have hereunto set my hand this 4th day of September, 1900.

WILLIAM BROWN.

Witnesses:
 FREDK. C. FRAENTZEL,
 GEO. D. RICHARDS.